United States Patent [19]

Goossen

[11] 4,006,714
[45] Feb. 8, 1977

[54] TRAINER AND CROWD GATE

[76] Inventor: Louis Goossen, Beatrice, Nebr. 68310

[22] Filed: June 16, 1975

[21] Appl. No.: 587,155

[52] U.S. Cl. .................................. 119/20; 256/10
[51] Int. Cl.² ......................................... A01K 3/00
[58] Field of Search ................ 119/29, 20, 22, 82, 119/155, 14.01, 14.03, 14.04, 63, 27; 231/2 E; 256/10, 23, 25

[56] References Cited
UNITED STATES PATENTS

| | | | |
|---|---|---|---|
| 2,642,683 | 6/1953 | Meyer | 256/10 |
| 2,691,359 | 10/1954 | Antiss et al. | 256/25 |
| 2,769,617 | 11/1956 | Hutchinson | 256/10 |
| 2,917,022 | 12/1959 | Grams | 119/27 |
| 3,038,444 | 6/1962 | Roth | 119/27 |
| 3,359,947 | 12/1967 | Biehl | 119/63 |
| 3,718,118 | 2/1973 | Bibles | 119/16 |
| 3,805,741 | 4/1974 | Thompson et al. | 119/14.04 |

Primary Examiner—Louis G. Mancene
Assistant Examiner—Peter K. Skiff
Attorney, Agent, or Firm—Wegner, Stellman, McCord, Wiles & Wood

[57] ABSTRACT

A training and crowd gate for urging animals to move through a passageway. The training and crowd gate includes an overhead track which extends along the passageway and a carriage movably suspended from the track. A cross arm is mounted on the carriage and a plurality of flexible electrical conductors hang downwardly from spaced points on the cross arm to form a barrier across the passageway. An audible signal, a conductor charger and a carriage drive unit are carried on the carriage. A control at an operator's station remote from the crowd gate simultaneously energizes the audible signal means and carriage drive unit and further connects the conductor charger to a source of electrical energy. By repeating the movement of the charged barrier in the presence of an audible signal, the animals are trained to associate the audible signal with the movement of the barrier in a charged state and are subsequently move through the passageway ahead of the barrier even without a charge on the conductors.

10 Claims, 4 Drawing Figures

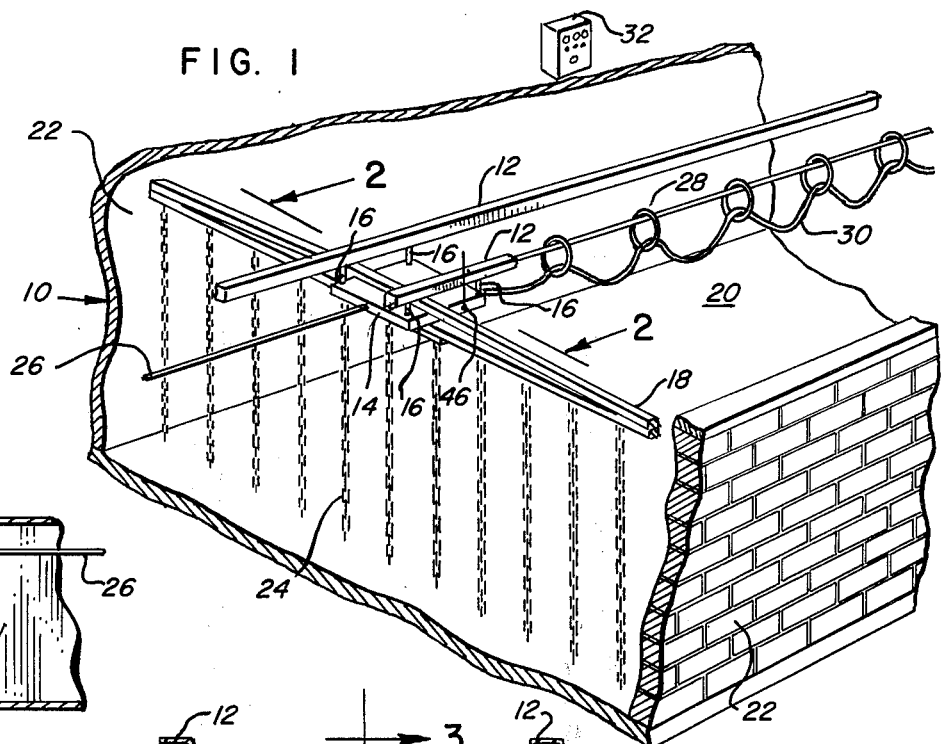
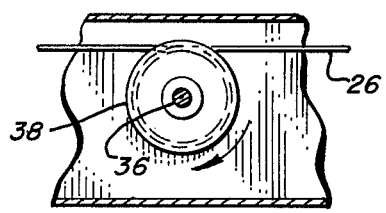
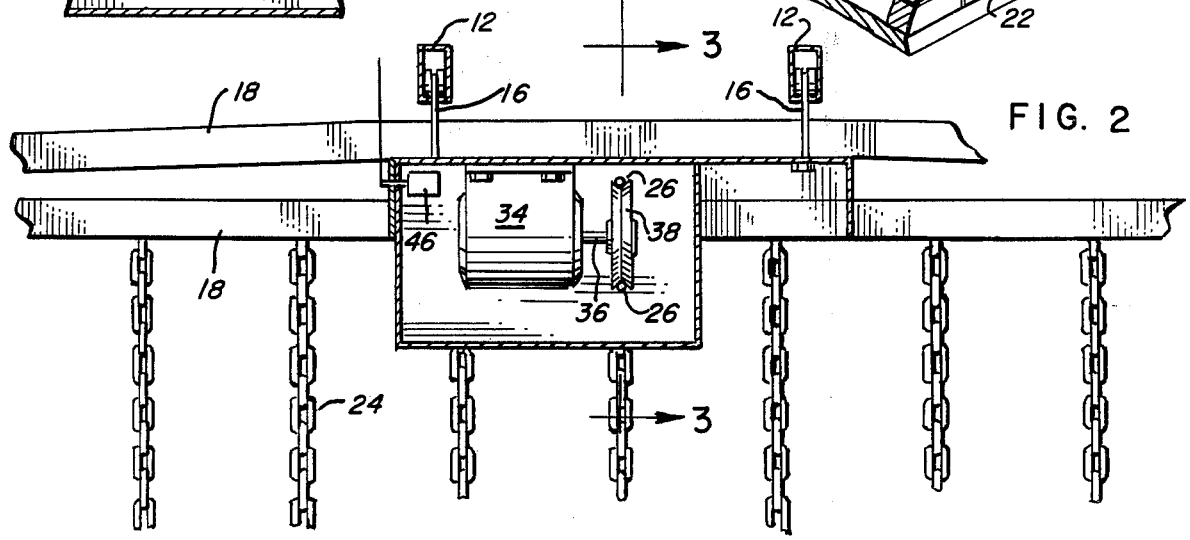
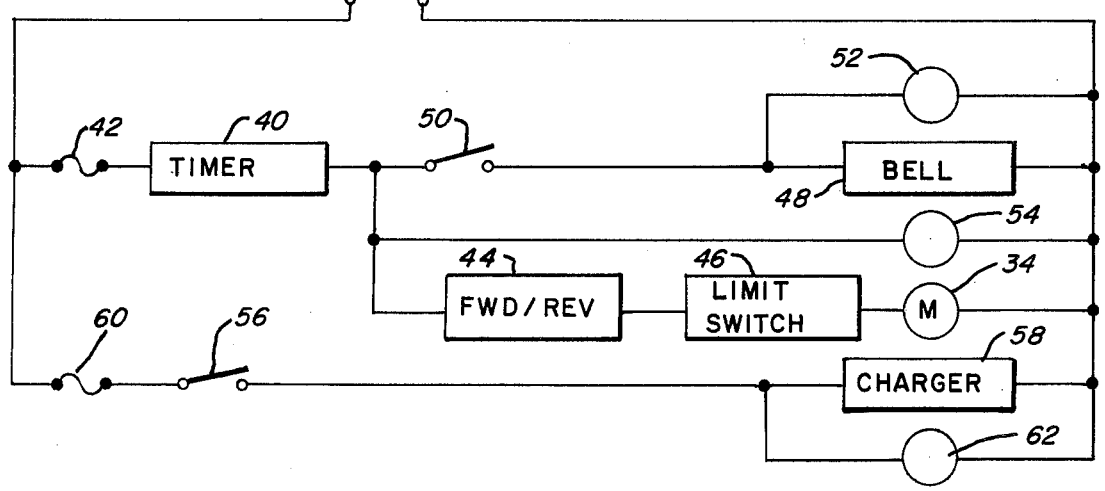

TRAINER AND CROWD GATE

BACKGROUND OF THE INVENTION

This invention relates to a training and crowd gate for urging animals to move through a passageway and more specifically, to a nonphysical crowd gate for moving a herd of dairy cows to a milking parlor.

Pertinent prior art includes the following U.S. Pat. Nos. Wood 2,476,233; Anstiss et al 2,691,359; Martinmaas 3,293,800; and Thompson et al 3,805,741. A Czechloslovakian patent 110,525 may also be relevant.

In certain prior art devices a movable fence section with and without electrically charged wires was proposed for prodding animals to move through a passageway. However, movable fence sections are physical crowd gates which are built of heavy materials to withstand the force of a crowding herd of animals against them. Moreover, a physical crowd gate, even with an electrical conductor to prod the animals along and to keep them from collecting against the movable fence section, is a throwback to the cumbersome guard gates which were previously mentioned and replaced by the electric guard gates. Another disadvantage of a physical crowd gate is that such a gate has to be pivoted or raised before the next group of livestock can move through the passageway. In addition, none of the prior art devices trained animals to walk ahead of a nonphysical charged barrier upon hearing an audible signal associated with the movement thereof so that animals would later walk ahead of the moving barrier in an uncharged state upon hearing the audible signal.

In still other prior art devices it was proposed that an electric guard gate replace the cumbersome and unwiedly gates usually employed on live-stock pens. Such electric guard gates included a cross arm with spaced vertical conductors suspended therefrom to shock animals that attempted to pass through the gate but allowed an automobile or truck to be driven therethrough without stopping to open or close the gate. However, none of these guard gates were movable crowd gates for urging animals to move through a passageway.

SUMMARY OF THE INVENTION

It is a primary object of the present invention to provide a training and crowd gate which has an electrically chargeable barrier that conditions animals to associate its movement and an audible signal with a charged state for urging the animals to walk through a passageway ahead of the barrier even though the same is uncharged.

Another object of the present invention is to provide a training and crowd gate which has vertically suspended and flexible electrical conductors that permit animals to walk through them to enter a passageway when uncharged but which becomes a barrier when charged, to eliminate the necessity of pivoting or raising the crowd gate to permit passage of the animals.

A further object of the present invention is to provide a crowd gate which eliminates the cumbersome construction of previous movable fence sections.

In accordance with the present invention, a training and crowd gate for urging animals to move through a passageway includes an overhead track which extends along the passageway. A carriage which has a reversible motor drivingly connected to a pulley rotatably engaging a drive cable parallel with the track, moves in a forward and reverse direction on the overhead track along the passageway. A cross arm is mounted on the carriage and extends across the passage. A plurality of electrical conductors hang downwardly from spaced points on the cross arm to form a flexible barrier across the passageway. A selectively actuable audible signal means is mounted on the carriage to be simultaneously actuated with the motor. The conductors are charged with a high voltage from a fence charger by actuating a switch at an operator's station.

One feature of the invention is the provision of an electric fence charger and a bell which are mounted on the carriage for electrifying the conductors to form a barrier, and for producing an audible signal, respectively, to train the animals when the barrier moves forward.

Another feature of the invention is that manually operable switches on a control panel, located at an operator's station remote from the crowd gate, may be set to simultaneously energize the carriage drive motor and the bell so that the sound of the bell will be associated with the movement of a charged barrier by the animals.

A further feature of the invention is that the barrier of electrical conductors are flexible chains hanging down from the cross bars so that the animals can walk through the uncharged suspended chains to enter the passageway without pivoting or raising the barrier first.

A still further feature of the invention is a single guide cable which loops around the pulley driven by the motor to move the carriage along the overhead track and which carries the control wires connected from the carriage to a control panel at an operator's station.

Further features and advantages of the invention will readily be apparent from the following specification and from the drawings.

BRIEF DESCRIPTION OF THE DRAWINGS

FIG. 1 is a diagrammatic illustration of a training and crowd gate embodying the invention;

FIG. 2 is an enlarged sectional view through the carriage taken along line 2—2 of FIG. 1;

FIG. 3 is a section taken along line 3—3 of FIG. 3; and

FIG. 4 is a schematic diagram of the electrical circuits for the gate;

DESCRIPTION OF THE PREFERRED EMBODIMENT

Turning first to FIG. 1, the training and crowd gate device for urging cows to move through a milking parlor holding pen 10 includes two parallel overhead tracks 12 suspended from the existing roof or ceiling of the holding pen 10 to extend the length thereof. A carriage 14 with a molded fiber glass housing is movably suspended from the overhead tracks 12 in a conventional manner by four trolleys 16, two on each track. A pair of cross arms 18 of approximately equal length are mounted on the carriage and extend across a passageway 20 of the milking parlor holding pen 10 to within approximately a foot of sidewalls 22 of the milking parlor. A plurality of electrical conductors 24 such as flexible chains are vertically suspended from spaced-apart points on the lower cross arm attached to the underside of the carriage and hang downwardly therefrom to form a barrier across the passageway 20. Preferably, the carriage and cross arms have an 8' clearance from the floor of the holding pen and the electrical conductors are a ⅛ inch link chain suspended approximately 24 inches from the holding pen floor and spaced 12 inches apart on the lower cross arm. A stationary drive cable 26 located between the tracks 12 and generally parallel therewith passes through holes in the front and back of the fiber glass housing of carriage 14 to engage a driving unit mounted thereon. Rings 28 encircle drive cable 26 to carry control wires in a cable 30 connected from the carriage to a control panel 32 at an operator's station located in the milking parlor.

Referring now to FIGS. 2 and 3, the fiber glass housing of carriage 14 encloses a reversible motor 34 with a drive shaft 36 drivingly connected to a pulley 38. The drive cable 26 makes a loop around the pulley 38 so that the actuation of reversible motor 34 moves the carriage 14 in a forward or reverse direction tracks 12.

The electric circuit for the trainer crowd gate device is shown in FIG. 4. The control panel 32 is connected to a 110 volt source, preferably, by a 3-wire grounded lead. The control panel 32 at an operator's station remote from the trainer crowd gate includes a timer 40 protected by a fuse 42. Timer 40 actuates reversible motor 34 through a forward/reverse switch 44 on the control panel 32 and a limit switch 46 on the carriage 14. The forward/reverse switch 44 and the limit switch 46, which are connected in series with the reversible motor 34, control the energization of the same. The carriage 14 moves in a forward or reverse direction corresponding respectively to a forward or reverse position of switch 44. Limit switch 46 on the carriage is physically tripped to deenergize the reversible motor 34 whenever the carriage 14 reaches a desired forward or rearward position along the passageway 20. A bell 48 is mounted within the housing of carriage 14. A toggle switch 50 on the control panel 32 allows the operator to selectively actuate the bell 48 if the timer 40 has been activated; a panel indicator 52 lights up when bell switch 50 is closed. An indicator light 54 on the control panel 32 lights up when the timer 40 is actuated by the operator and remains lit as long as the timer is actuated.

A toggle switch 56 on the control panel 32 allows the operator to selectively energize a high voltage generator 58, such as an electric fence charger, which charges the flexible electrical conductors 24. A fuse 60 protects the charger circuit from an overload condition. An indicator light 62 on the control panel 32 lights up to indicate when the charger switch 56 is closed and the electrical conductors are in their charged state.

In operation, the trainer crowd gate is moved along the track to its rearwardmost position which is at the entrance of the milking parlor holding pen 10. Charger switch 56 is open and timer 40 in the bell and motor circuits is deactivated. The cows enter the holding pen at the entrance and walk through the vertically suspended chains 24. After the cows are directed to walk through the uncharged chains for several milkings, when the crowd gate is located at the entrance of the holding pen, the cows will not hesitate later to enter the holding pen through the suspended chains. During this part of the training period, it is advisable not to use the crowd gate for urging the cows to move into the preparatory stalls.

As soon as the cows are accustomed to walking through the suspended chains, the conditioning part of the training period begins. After the cows have entered the holding pen, the switch 56 is closed to energize fence charger 58 and to put an electrical charge on the suspended chains 24. When the operator is ready to move cows into the milking parlor, timer 40 is activated, bell switch 50 closed and switch 44 placed in its forward position. Upon actuation of the motor 34, the trainer crowd gate moves forwardly through the passageway 20 behind the animals at a rate of approximately 8' per minute. Simultaneously, an audible signal is provided by the ball 48. At first, the cows may walk up to the chain barrier and find it charged, or the travel of the crowd gate brings the chain barrier into contact with a lingering cow. In either case, the cow receives a shock and moves forward toward the milking parlor. By repeating the movement of the charged barrier in conjunction with the audible signal from the bell, the cows become trained to associate the ringing of the bell with the movement of a charged barrier. Subsequently, the barrier can be moved through the passageway of the milking parlor holding pen in an unchanged condition with the bell ringing and the cows will walk ahead of it while maintaining a safe distance between themselves and the barrier.

I claim:

1. A crowd gate for urging animals to move through a passage from an entry at one end to an exit at the opposite end, comprising:
    an overhead track extending along said passage;
    a carriage movable on said track;
    means for moving said carriage on the track along the passage between the entry and exit;
    a cross arm mounted on said carriage and extending across said passage;
    a plurality of elongate electrical conductors suspended from spaced points on said cross arm and hanging downwardly therefrom forming a barrier across the passage; and
    means for selectively connecting said conductors with a source of electrical energy, whereby said conductors may be connected with said electrical source during movement of the carriage along the passage from the entry to the exit encouraging the animals to move ahead of the barrier toward the exit and said conductors may be disconnected from the electrical source when the barrier is positioned adjacent said entry, allowing animals to move through the barrier into the passage.

2. The crowd gate of claim 1 having a selectively operable animal alarm.

3. The crowd gate of claim 1 in which said conductors are chains.

4. The crowd gate of claim 1 including a high voltage generator on said carriage and connected with said conductors, an a operator's station remote from said gate and track, connected electrically with the carriage, said operator's station including means for selectively energizing said high voltage generator.

5. The crowd gate of claim 1 in which the carriage moving means includes a drive cable extending through the passage, along said track, a reversible motor on said carriage, and a drive pulley powered by the motor and connected with the drive cable for moving the carriage and cross arm along the passage.

6. The crowd gate of claim 5 including an operator's station remote from said track and electrically connected with the carriage and means at said operator's station for selectively energizing said motor.

7. A crowd gate for urging animals to move through a passage from an entry at one end to an exit at the opposite end, comprising:

two overhead tracks spaced laterally apart extending along said passage on either side of the center thereof;

a carriage suspended from said tracks;

a cross arm mounted on said carriage extending from each side thereof across said passage;

a plurality of flexible electric conductors suspended from spaced points on said cross arm and hanging downwardly therefrom forming an animal barrier across said passage;

a selectively operable high voltage generator mounted on said carriage connected with said cross arm and flexible conductors;

a drive cable extending along said passage between said tracks; and a reversible motor on said carriage connected with said drive cable to move the carriage along the passage, whereby said conductors may be connected with said electrical source during movement of the carriage along the passage from the entry to the exit encouraging the animals to move ahead of the barrier toward the exit and said conductors may be disconnected from the electrical source when the barrier is positioned adjacent said entry, allowing animals to move through the barrier into the passage.

8. The crowd gate of claim 7 including an operator's station remote from said track and connected with said carriage through an electrical control cable, means at said operator's station for selectively energizing said high voltage generator, and further means at said operator's station for selectively actuating said reversible motor to move the carriage and barrier along the passage.

9. The crowd gate of claim 8 including an operator actuated timer at said operator's station forming a part of the motor actuating means.

10. The crowd gate of claim 8 including a bell on said carriage and means at said operator's station for selectively actuating the bell.

* * * * *